(12) United States Patent
Min et al.

(10) Patent No.: US 9,823,067 B2
(45) Date of Patent: Nov. 21, 2017

(54) METHODS FOR CALCULATING DISTANCE USING DEPTH SENSOR AND APPARATUSES PERFORMING THE SAME

(71) Applicant: Samsung Electronics Co., Ltd., Suwon-Si, Gyeonggi-Do (KR)

(72) Inventors: Dong Ki Min, Seoul (KR); Wang Hyun Kim, Namyangju-si (KR); Sun Hwa Jung, Seoul (KR); Tae Chan Kim, Yongin-si (KR); Hye Kyoung Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 609 days.

(21) Appl. No.: 14/448,673

(22) Filed: Jul. 31, 2014

(65) Prior Publication Data
US 2015/0070684 A1    Mar. 12, 2015

(30) Foreign Application Priority Data
Sep. 9, 2013  (KR) ..................... 10-2013-0107680

(51) Int. Cl.
| | | |
|---|---|---|
| G01C 3/08 | (2006.01) | |
| G01S 17/32 | (2006.01) | |
| G01S 17/89 | (2006.01) | |
| G01S 7/491 | (2006.01) | |

(52) U.S. Cl.
CPC .............. *G01C 3/08* (2013.01); *G01S 7/4914* (2013.01); *G01S 17/32* (2013.01); *G01S 17/89* (2013.01)

(58) Field of Classification Search
CPC .................................. G06K 9/00; G06T 15/00
See application file for complete search history.

(56) References Cited

U.S. PATENT DOCUMENTS

| | | | |
|---|---|---|---|
| 7,791,715 B1 | 9/2010 | Bamji | |
| 2003/0034462 A1* | 2/2003 | Remillard | .............. G02B 5/136 |
| | | | 250/559.38 |
| 2010/0290674 A1* | 11/2010 | Kim | ........................ G01S 17/89 |
| | | | 382/106 |

* cited by examiner

*Primary Examiner* — Luke Ratcliffe
(74) *Attorney, Agent, or Firm* — Harness, Dickey & Pierce, P.L.C.

(57) ABSTRACT

A method of calculating, using a depth sensor, a distance excluding an ambiguity distance including outputting a modulated light signal output from a light source to an object, receiving the modulated light signal reflected by the object, calculating a distance between the light source and the object using the reflected modulated light signal input to photo gates in conjunction with demodulation signals supplied to the photo gates, the calculating including calculating, using the modulated light signal, at least one distance farther than a maximum measurable distance, and setting the at least one distance to be equal to the maximum measurable distance may be provided. A range of the distance farther than the maximum measurable distance can be determined according to a duty ratio of the modulated light signal.

20 Claims, 17 Drawing Sheets

FIG. 7

| Section | Zc |
|---------|-----|
| SEC1 | $Zc=(2y-x)/8$ |
| SEC2 | $Zc=(y-2x)/4$ |
| SEC3 | $Zc=-(x+y)/2$ |
| SEC4 | $Zc=5/2*x-2y$ |
| SEC5 | $Zc=1$ |
| SEC6 | $Zc=(-x+2y)/2$ |

FIG. 13

| Section | Zf |
|---------|-----|
| SEC1' | Zf=−6.896*(Zi)^4+13.87*(Zi)^3−9.683*(Zi)^2+3.806*(Zi)−0.2858 |
| SEC2' | Zf=182.2*(Zi)^4−407.7*(Zi)^3+344.8*(Zi)^2−129.1*(Zi)+18.42 |
| SEC3' | 1 |
| SEC4' | 1 |

METHODS FOR CALCULATING DISTANCE USING DEPTH SENSOR AND APPARATUSES PERFORMING THE SAME

CROSS-REFERENCE TO RELATED APPLICATIONS

This application claims priority under 35 U.S.C. §119(a) to Korean Patent Application No. 10-2013-0107680 filed on Sep. 9, 2013, the disclosure of which is hereby incorporated by reference in its entirety.

BACKGROUND

Example embodiments of the present inventive concepts relate to a distance calculation technology using a depth sensor (alternatively, a distance sensor), and more particularly to a method of distinguishing an ambiguity distance using a light signal having a special modulation pattern and demodulation signals input to each unit pixel, and/removing the ambiguity distance, and/or devices performing the method.

A sensor is an element which detects a state or a position of an object, and converts a result of the detection into an electrical signal. As a type of the sensor, for example, a photo sensor, a temperature sensor, a pressure sensor, a magnetic sensor, or a depth sensor may be used.

The depth sensor among these sensors may measure a delay time or delay phase taken until a pulse signal output from a light source is reflected and returned by an object, and calculate a depth or a distance between the depth sensor and the object. The pulse signal may be a microwave, a light wave or an ultrasonics wave. The depth sensor may calculate a depth or a distance using conventional methods, for example, a time of flight (TOF) method. The depth or the distance calculated by the conventional methods may create ambiguity (i.e., ambiguity distance) in a range of measurement. For example, objects at a certain range of measurement distance may have a same phase value for a certain modulation frequency.

SUMMARY

According to an example embodiment of the present inventive concepts, a method of calculating, using a depth sensor, a distance excluding an ambiguity distance may include outputting a modulated light signal output from a light source as an object, receiving the modulated light signal reflected by the object, and calculating a distance between the light source and the object using the reflected modulated light signal input to photo gates in conjunction with demodulation signals supplied to the photo gates, the calculating including calculating, using the modulated light signal, at least one distance farther than a maximum measurable distance, and setting the at least one distance farther than the maximum measurable distance to be equal to the maximum measurable distance.

A range of the distance farther than the maximum measurable distance may be determined according to a duty ratio of the modulated light signal. A duty ratio of each of the modulated light signal and the demodulation signals is determined to be $1/(2n)$, and n is a natural number. The maximum measurable distance is determined according to $Dmax=c/(2f)$, where Dmax is the maximum measurable distance, c is a speed of light, and f is a frequency of the modulated light signal.

The at least one distance farther than the maximum measurable distance may include a plurality of farther distances and the calculating may calculate a distance of a first region among the farther distances as a distance equal to the maximum measurable distance, and calculate a distance of a second region among the farther distances as a distance equal to or less than the maximum measurable distance. The first region and the second region may be periodically repeated.

According to an example embodiment of the present inventive concepts, an image processing system may include a light source configured to output a modulated light signal to an object, a depth sensor pixel configured to output a pixel signal using demodulation signals and the modulated light signal reflected by the object, a readout circuit configured to output image data corresponding to the pixel signal, and an image signal processor configured to calculate a distance between the light source and the object based on the image data and configured to calculate, using the modulated light signal, at least one distance farther than a maximum measurable distance to be a distance equal to the maximum measurable distance.

The pixel and the read out circuit may be embodied in a first chip, and the image signal processor may be embodied in a second chip. The first chip and the second chip may be packaged in one package.

According to an example embodiment of the present inventive concepts, a portable electronic device may include the image processing system and a display configured to display a depth image including a distance calculated by the image processing system. A range of the distance farther than the maximum measurable distance may be determined according to a duty ratio of the modulated light signal, and a duty ratio of each of the modulated light signal and the demodulated signals is determined to be $1/(2n)$, where n is a natural number.

According to an example embodiment of the present inventive concepts, a method of calculating a distance using a depth sensor may include outputting a modulated light signal output from a light source to an object, receiving, using an image sensor, the modulated light signal reflected by the object, generating, using the image sensor, image data in conjunction with demodulation signals, and processing, using an image signal processor, the image data to calculate a measured distance between the light source and the object such that at least one distance farther than a maximum measurable distance is set to be equal to a maximum measurable distance to remove ambiguity distance.

The processing may include dividing the measured distance normalized by the maximum measurable distance into a plurality of sections using at least one correlation function, the correlation function derived from a difference between two pixel signals associated with one sub pixel of a unit pixel of the image sensor.

The processing may include determining a corresponding section by comparing a value of the correlation function with respect to a reference value.

BRIEF DESCRIPTION OF THE DRAWINGS

These and/or other aspects and advantages of the present inventive concepts will become apparent and more readily appreciated from the following description of some example embodiments, taken in conjunction with the accompanying drawings of which:

FIG. 7 is an example equations for calculating respective depths of sections determined in FIG. 6;

FIG. 13 is an example embodiment of equations for calculating a final calculated depth in each of the sections illustrated in FIG. 11;

DETAILED DESCRIPTION

Figure 1:
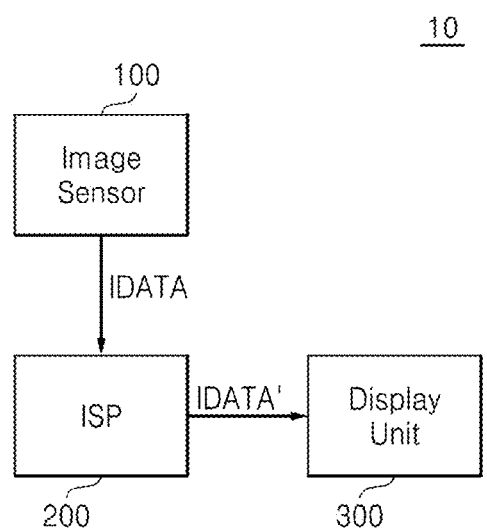
FIG. 1 is a block diagram of an image processing system according to an example embodiments of the present inventive concepts.

Various example embodiments now will be described more fully hereinafter with reference to the accompanying drawings, in which some example embodiments are shown. The present disclosure may, however, be embodied in many different forms and should not be construed as limited to the example embodiments set forth herein. Rather, these example embodiments are provided so that this disclosure will be thorough and complete, and will fully convey the scope of example embodiments to those skilled in the art. In the drawings, the size and relative sizes of layers and regions may be exaggerated for clarity. Like numbers refer to like elements throughout.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, some example embodiments will be explained in further detail with reference to the accompanying drawings.

FIG. 1 is a block diagram of an image processing system according to an example embodiment of the present inventive concepts. Referring to FIG. 1, an image processing system 10 may include an image sensor 100, an image signal processor ISP 200, and a display unit 300.

The image processing system 10 may perform a function of a distance calculation system, the image sensor 100 may perform a function of a depth sensor, and the ISP 200 may perform a function of a distance calculation circuit, which calculates a distance.

The image processing system or the distance calculation system may be embodied in, for example, a portable electronic device. The portable electronic device may be embodied in, for example, a smart phone, a tablet PC, a mobile internet device (MID), a wearable computer, an internet of things (IoT) device, or an internet of everything (IoE) device.

According to another example embodiment, the ISP 200 may be included in the image sensor 100. According to still another example embodiment, the image sensor 100 and the ISP 200 may be embodied in a system on chip (SoC), or packaged in a form of one package, e.g., a multi-chip package (MCP). According to still another example embodiment, the image sensor 100 may be hardware, firmware, hardware executing software or any combination thereof. For example, the image sensor 100 may be embodied in a CMOS image sensor chip. When the image signal sensor 100 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the image signal processor 100

The image sensor 100 and the ISP 200 may be included in one data processing system. The image sensor 100 may output image data IDATA corresponding to an image of an object.

According to an example embodiment, the image sensor 100 may perform a function of a depth sensor, which may acquire depth information or depth image of an object and process the acquired information. Here, the image sensor 100 may operate based on a time-of-flight (TOF) method.

The ISP 200 may receive the image data IDATA, process the received image data IDATA, and generate the processed image data IDATA'. For example, the image data IDATA' may include the depth information (or depth image) of the object. According to an example embodiment, the ISP 200 may correct an error included in the image data IDATA or improve a quality of the image data IDATA by processing the image data IDATA.

The ISP 200 may transmit the processed image data IDATA' to the display unit 300. The display unit 300 may mean various types of displays which is capable of displaying the processed image data IDATA'. According to some example embodiments, the display unit 300 may be embodied in, for example, a Liquid Crystal Display (LCD), a Light Emitting Diodes (LED) display, an Organic LED (OLED) display, an Active Matrix OLED (AMOLED) display, or a flexible display.

Figure 2:
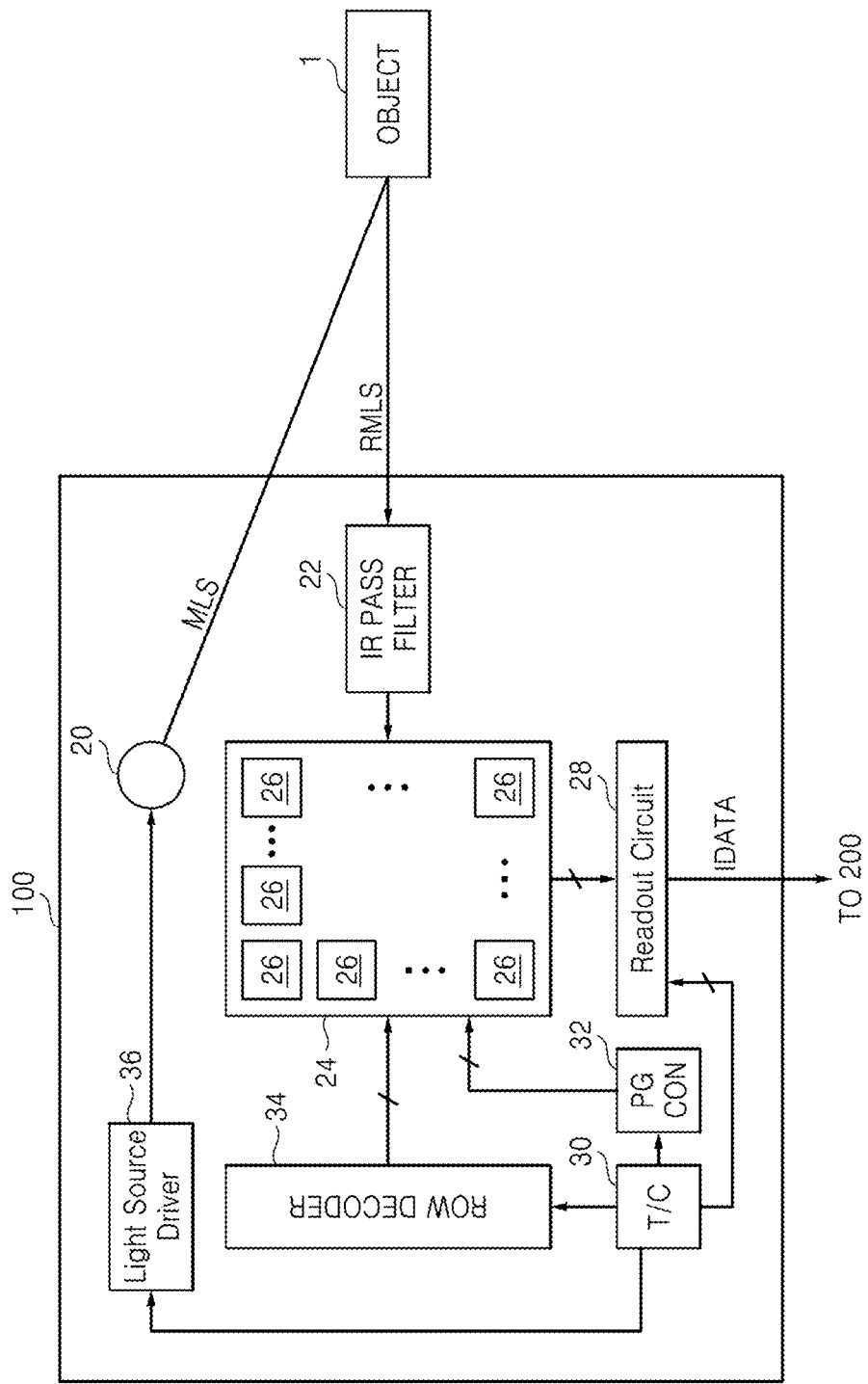
FIG. 2 is a block diagram according to an example embodiment of the image sensor illustrated in FIG. 1.

FIG. 2 is a block diagram according to an example embodiment of the image sensor illustrated in FIG. 1. For convenience of description, an object 1 is illustrated along with the image sensor 100. Referring to FIGS. 1 and 2, the image sensor 100 may include a light source 20, an infrared (IR) pass filter 22, a depth sensor pixel array 24, a readout circuit 28, a timing controller 30, a photo gate controller 32, a row decoder 34, and a light source driver 36.

The light source 20 may output a modulated light signal MLS, e.g., infrared light, to the object 1 according to a control of the light source driver 36. The infrared pass filter 22 may transmit a modulated light signal RMLS reflected by the object 1 to the depth sensor pixel array 24.

The depth sensor pixel array 24 may include a plurality of unit pixels 26. Each structure of the plurality of unit pixels 26 will be described in detail referring to FIG. 3. According to an example embodiment, each of the plurality of unit pixels 26 may be a depth sensor pixel operating based on the TOF method.

The readout circuit 28 may generate the image data IDATA based on pixel signals output from the depth sensor pixel array 24. For example, the readout circuit 28 may perform an analog to digital conversion on the pixel signals. The timing controller 30 may various control components (e.g., the readout circuit 28, the photo gate controller 32, the row decoder 34, and/or the light source driver 36) of the image sensor 100.

The photo gate controller 32 may generate demodulation signals according to a control of the timing controller 30, and transmit the generated demodulation signals to the depth sensor pixel array 24. The demodulation signals may mean signals for controlling each of the photo gates included in each of the unit pixels 26, however, it is not limited thereto. The demodulation signals will be described in detail referring to FIGS. 3 and 4.

The row decoder 34 may decode a plurality of row control signals output from the timing controller 30 and drive the plurality of unit pixels included in the depth sensor pixel array 24 row-by-row. The row decoder 34 may include a row driver. The light source driver 36 may drive the light source 20 according to a control of the timing controller 30.

Figure 3:
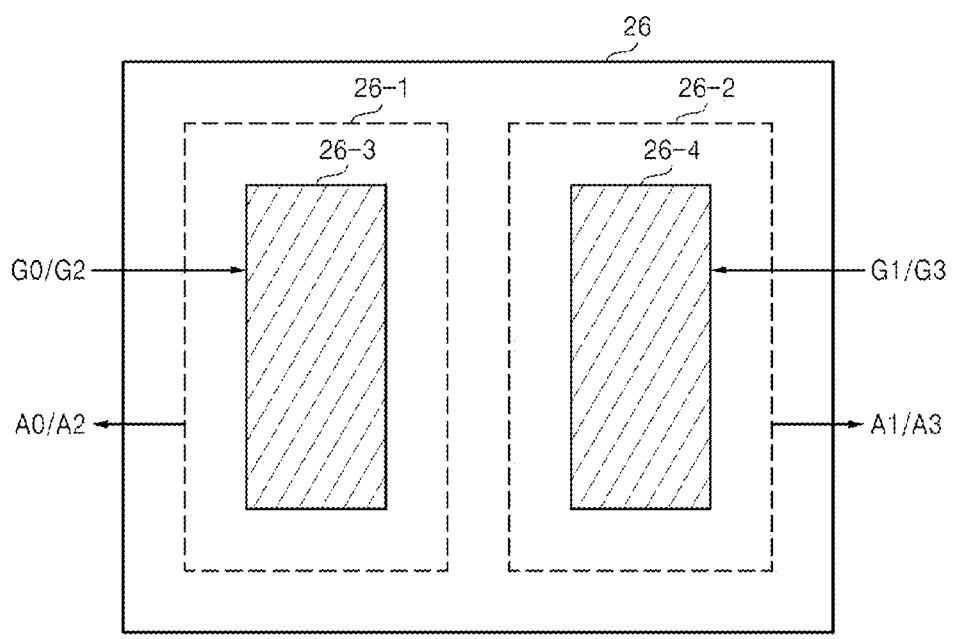
FIG. 3 is an example embodiment of a unit pixel included in the image sensor illustrated in FIG. 2.

FIG. 3 is an example embodiment of a unit pixel included in the image sensor illustrated in FIG. 2. Referring to FIGS. 2 and 3, each unit pixel 26 may have a two-tap structure. Each unit pixel 26 includes a first sub pixel 26-1 and a second sub pixel 26-2. Each of the sub pixels 26-1 and 26-2 includes a photoelectric conversion element 26-3 or 26-4. According to an example embodiment, the photoelectric conversion element 26-3 or 26-4 may be embodied in a photo gate, however, it is not limited thereto.

The first sub pixel 26-1 may receive a first demodulation signal G0 or a third demodulation signal G2 for controlling an operation of a first photoelectric conversion element 26-3 included in the first sub pixel 26-1. The first sub pixel 26-1 may output a first pixel signal A0 or a third pixel signal A2 according to the first demodulation signal G0 or the third demodulation signal G2. The second sub pixel 26-2 may receive a second demodulation signal G1 or a fourth demodulation signal G3 for controlling an operation of a second photoelectric conversion element 26-4 included in the second sub pixel 26-2. The second sub pixel 26-2 may output a second pixel signal A1 or a fourth pixel signal A3 according to the second demodulation signal G1 or the fourth demodulation signal G3.

Referring to FIGS. 1 to 3, the image data IDATA may be generated according to a result of processing a plurality of pixel signals A0 to A3. The readout circuit 28 may output the image data IDATA to the ISP 200.

Figure 4:
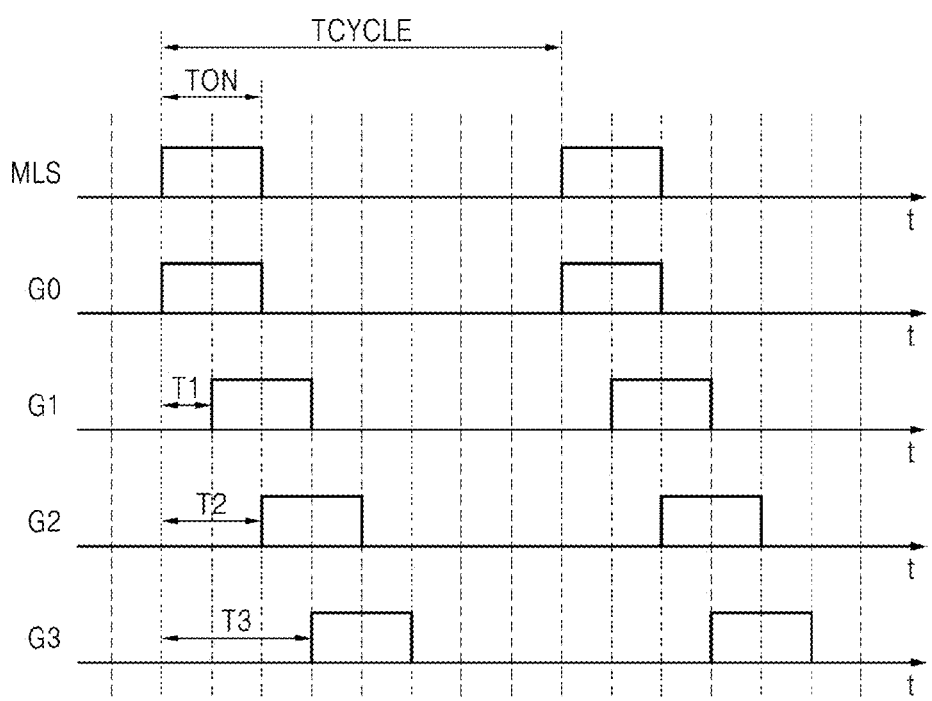
FIG. 4 is an example embodiment of a timing diagram of the modulated light signal illustrated in FIG. 2 and the demodulation signals illustrated in FIG. 3.

FIG. 4 is an example embodiment of a timing diagram of the modulated light signal illustrated in FIG. 2 and the demodulation signals illustrated in FIG. 3. The image processing system 10 may distinguish an ambiguity distance by using a light signal MLS having a specific modulation pattern and the demodulation signals G0 to G3 input to each unit pixel 26, and remove the ambiguity distance. The ambiguity distance in the present inventive concepts may mean a distance equal to or greater than a maximum measurable distance. The depth or the distance calculated by the conventional methods may create ambiguity (i.e., ambiguity distance) in a range of measurement. For example, objects at a certain range of measurement distance may have a same phase value for a certain modulation frequency.

A duty ratio of the modulated light signal MLS may be determined to be $1/(2n)$, but it is illustrated and described that n is two for convenience of description in FIG. 4. Here, n is a natural number. Referring to FIGS. 2 to 4, the modulated light signal MLS may have on-time TON corresponding to $1/(2*2)$ of a cycle TCYCLE of the modulated light signal MLS. That is, the modulated light signal MLS may have a duty ratio of 25%.

Each of the demodulation signals G0 to G3 may have a duty ratio of 25% like the modulated light signal MLS. A phase difference T1 between a first demodulation signal G0 and a second demodulation signal G1 corresponds to a half of the on-time TON.

A phase difference T2 between the first demodulation signal G0 and the third demodulation signal G2 corresponds to the on-time TON, and a phase difference T3 between the first demodulation signal G0 and the fourth demodulation signal G3 corresponds to 1.5 times of the on-time TON. As illustrated in FIG. 4, for example, T2 is equal to 2*T1 and T3 is equal to 3*T1.

Figure 5:
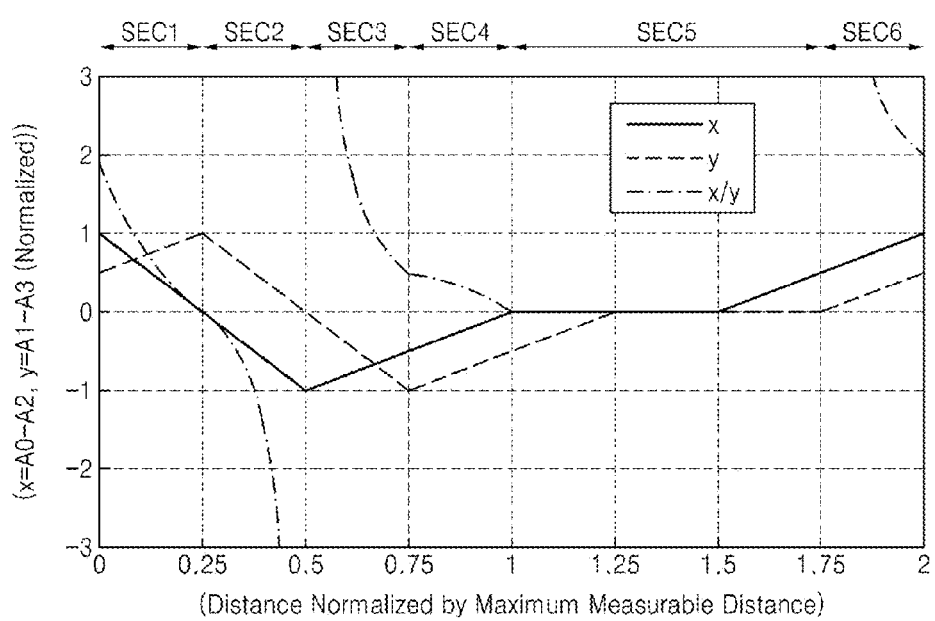
FIG. 5 is a graph depicting correlation functions based on pixel signals generated in accordance with the timing diagram of FIG. 4.

FIG. 5 is a graph depicting correlation functions based on pixel signals generated in accordance with the timing diagram of FIG. 4.

Referring to FIGS. 3 to 5, when a reflected modulated light signal RMLS passed through the infrared pass filter 22 is input to the unit pixel 26, a first pixel signal A0 may be output from the first sub pixel 26-1 in response to the first demodulation signal G0, the second pixel signal A1 may be output from the second sub pixel 26-1 in response to the second demodulation signal G1, a third pixel signal A2 may be output from the first sub pixel 26-1 in response to the third demodulation signal G2, and a fourth pixel signal A3 may be output from the second sub pixel 26-2 in response to the fourth demodulation signal G3. A first correlation function x is related to a normalized value of a difference between the first pixel signal A0 and the third pixel signal A2, i.e., x=A0−A2, and a second correlation function y is a normalized value of a difference between the second pixel signal A1 and the fourth pixel signal A3, i.e., y=A1−A3.

In a graph of FIG. 5, a third correlation function x/y corresponding to a value obtained by dividing the first correlation function x by the second correlation function y is also illustrated. Each correlation function x, y, or x/y has a value varying with a distance normalized by a maximum measurable distance. The maximum measurable distance Dmax is determined according to Equation 1.

$$Dmax=c/2f \qquad \text{[Equation 1]}$$

Here, Dmax is the maximum measurable distance, c is a speed of light, and f is a frequency of a modulated light signal (MLS of FIG. 2). In the graph of FIG. 5, the maximum measurable distance Dmax may mean "1" on an x-axis. For example, when n determining a duty ratio of the modulated light signal MLS is 2, an ambiguity distance may be greater than $(2k-1)*Dmax$ and less than $2k*Dmax$. Here, k is a natural number.

Further, when n determining the duty ratio of the modulated light signal MLS is three, the ambiguity distance may be greater than $(3K-2)*Dmax$ and less than $3k*Dmax$. That is, because the modulated light signal MLS is a periodic signal, the ambiguity distance also is periodically generated.

A normalized distance on the x-axis may be divided into a plurality of sections SEC1 to SEC6. Each section SEC1 to SEC6 including a measured distance may be divided using each correlation function x, y, or x/y. A method of dividing or determining each section SEC1 to SEC6 which includes the measured distance will be described in detail referring to FIG. 6.

Figure 6:
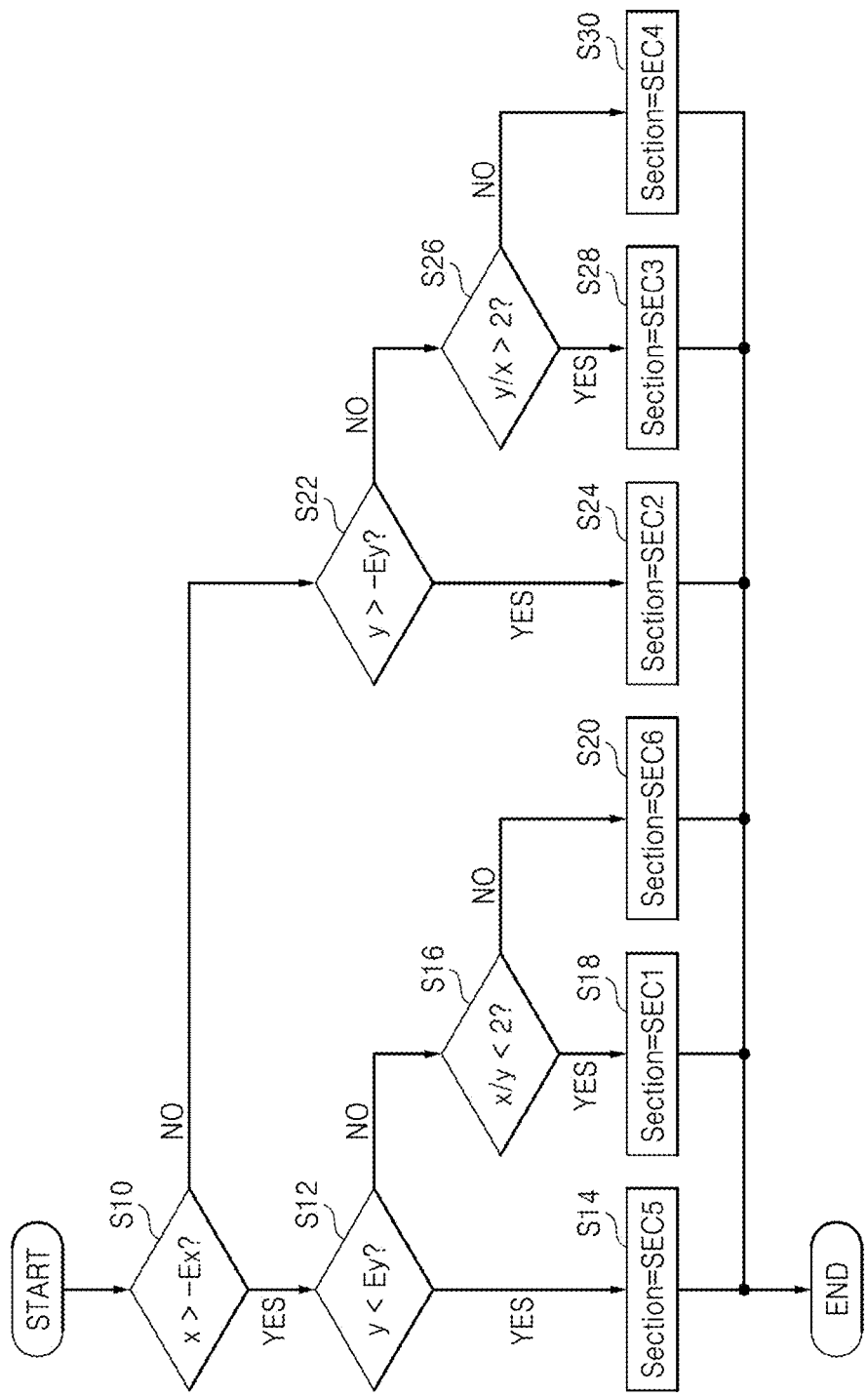
FIG. 6 is a flowchart depicting a method of determining a section including a measured distance using correlation functions x, y, and x/y illustrated in FIG. 5.

FIG. 6 is a flowchart depicting a method of determining a section including a measured distance using the correlation functions x, y, and x/y illustrated in FIG. 5. Referring to FIGS. 5 and 6, each of a first reference value −Ex, a second reference value Ey, and a fourth reference value −Ey may be set so as to include an error range, and may mean a value close to zero. The first reference value −Ex and the fourth reference value −Ey have negative values, and the second reference value Ey has a positive value.

A functional value of the first correlation function x may be compared to the first reference value −Ex (S10). According to a result of the comparison in operation S10, when the functional value of the first correlation function x is greater than the first reference value −Ex, a functional value of the second correlation function y may be compared to the second reference value Ey (S12).

According to a result of the comparison in operation (or step) S12, when a functional value of the second correlation function y is less than the second reference value Ey, a measured distance may be determined to be included in a fifth section SEC5 (S14). According to the result of the comparison in S12, when a functional value of the second correlation function y is equal to or greater than the second reference value Ey, a functional value of a third correlation function x/y may be compared to the third reference value, e.g., two (S16).

According to a result of the comparison in operation S16, when a functional value of the third correlation function x/y is less than the third reference value, e.g., two, the measured distance may be determined to be included in a first section SEC1 (S18). According to the result of the comparison in S16, when a functional value of the third correlation function x/y is equal to or greater than the third reference value, e.g., two, the measured distance may be determined to be included in a sixth section SEC6 (S20).

According to the result of the comparison in operation S10, when a functional value of the first correlation function x is equal to or less than the first reference value −Ex, the functional value of the second correlation function y may be compared to the fourth reference value −Ey (S22). According to a result of the comparison in operation S22, when a functional value of the second correlation function y is greater than the fourth reference value −Ey, the measured distance may be determined to be included in the second section SEC2 (S24).

According to the result of the comparison in operation S22, when a functional value of the second correlation function y is equal to or less than the fourth reference value −Ey, the reciprocal y/x of a functional value of the third correlation function x/y may be compared to the third reference value, e.g., two (S26). According to a result of the comparison in operation S26, when the reciprocal y/x of the functional value of the third correlation function x/y is greater than the third reference value, e.g., two, the measured distance may be determined to be included in a third section SEC3(S28).

According to the result of the comparison in operation S26, when the reciprocal y/x of the functional value of the third correlation function x/y is equal to or less than the third reference value, e.g., two, the measured distance may be determined to be included in a fourth section SEC4(S30). With respect to each section SEC1 to SEC6 where a measured distance is included, the measured distance may be calculated according to an equation illustrated in FIG. 7.

FIG. 7 is an example embodiment of equations for calculating respective depths of sections determined in FIG. 6. Referring to FIGS. 5 to 7, when the measured distance is included in a first section SEC1, a calculated depth Zc may be calculated by a first equation Zc=(2y−x)/8.

When the measured distance is included in a second section SEC2, the calculated depth Zc may be calculated by a second equation Zc=(y−2x)/4. When the measured distance is included in a third section SEC3, the calculated depth Zc may be calculated by a third equation $Zc=-(x+y)/2$.

When the measured distance is included in a fourth section SEC4, the calculated depth Zc may be calculated by a fourth equation $Zc=5/2*x-2y$. When the measured distance is included in a fifth section SEC5, the calculated depth Zc may be calculated by a fifth equation $Zc=1$. When the measured distance is included in a sixth section SEC6, the calculated depth Zc may be calculated by $Zc=(-x+2y)/2$.

Figure 8:
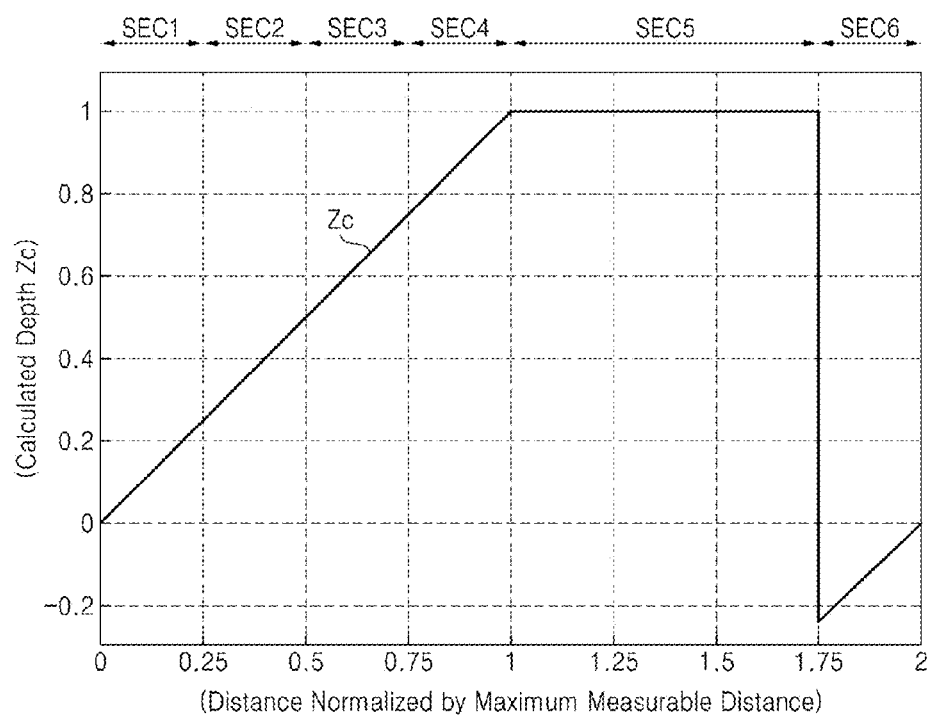
FIG. 8 is a graph depicting the calculated depth using the equations of FIG. 7.

FIG. 8 is a graph depicting the calculated depth using the equations of FIG. 7. Referring to FIGS. 5 to 8, the calculated depth Zc may be calculated using the equation of FIG. 7 corresponding to each section SEC1 to SEC6, the first correlation function x, and the second correlation function y.

The calculated depth Zc may be shown in a form of the graph of FIG. 8. When a normalized calculated depth Zc in the maximum measurable distance is one, e.g., "1" on the x-axis, the calculated depth Zc may be calculated as one in a distance farther than the maximum measurable distance, e.g., a distance between 1 and 1.75 on the x-axis. For example, the image processing system 10 may calculate the calculated depth Zc until the calculated depth reaches the maximum measurable distance, but the image processing system 10 calculates the calculated depth as one in the farther distance.

When the first section SEC1 is shifted to left, the sixth section SEC6 of FIG. 8 may be used in calculating a distance in a wider range. Accordingly, a measurable distance range may be from −0.25 to 1 (i.e., having a width of 1.25) on the basis of the normalized calculated depth Zc.

Figure 9:
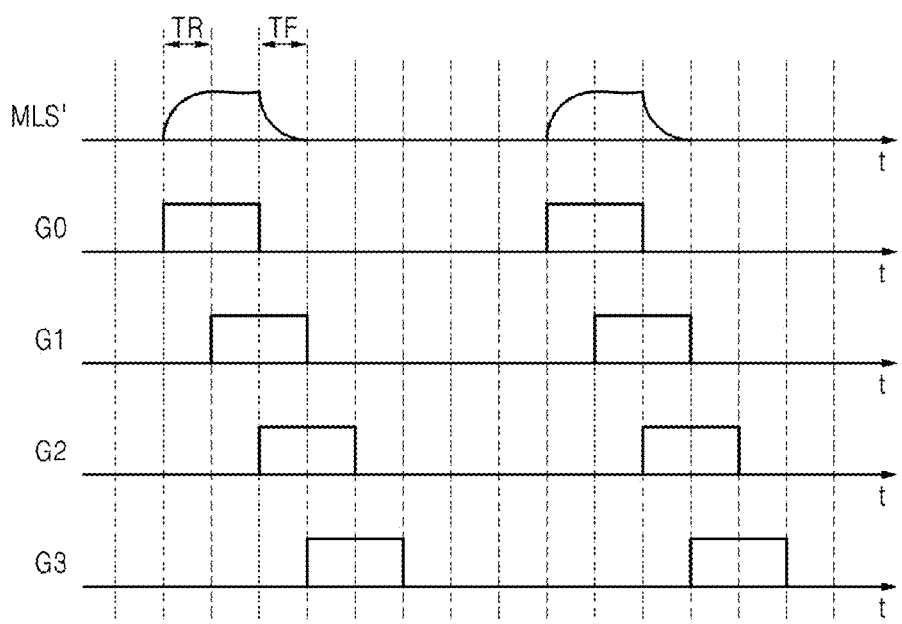
FIG. 9 is another example embodiment of a timing diagram of the modulated light signal illustrated in FIG. 2 and demodulation signals illustrated in FIG. 3.

FIG. 9 is another example embodiment of a timing diagram for the modulated light signal illustrated in FIG. 2 and the demodulation signals illustrated in FIG. 3. Referring to FIGS. 2 to 4, and 9, when comparing with the modulated light signal MLS of FIG. 4, a modulated light signal MLS' has a rising time TR and a falling time TF. The modulated light signal MLS' may be output from the light source 20 of FIG. 1.

Figure 10:
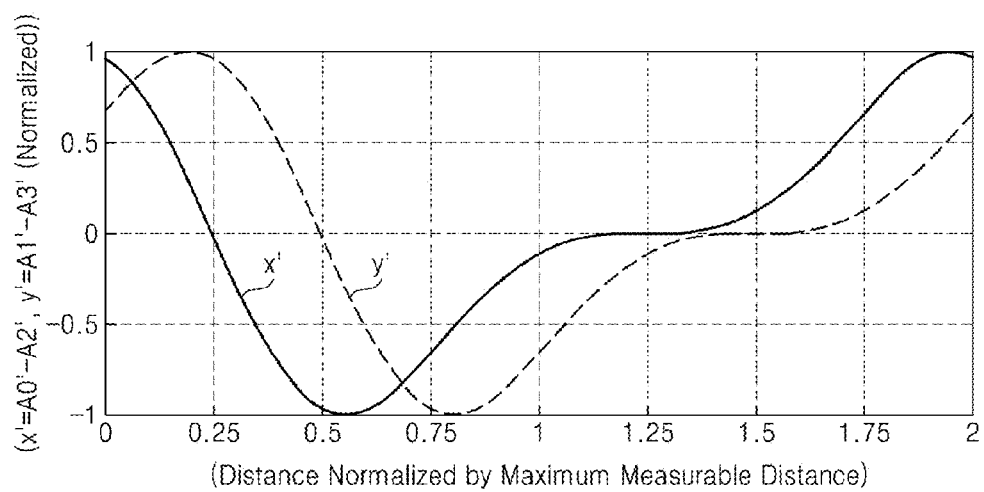
FIG. 10 is a graph depicting correlation functions based on pixel signals generated according to the modulated light signal and demodulation signals of FIG. 9.

FIG. 10 is a graph depicting correlation functions based on pixel signals generated according to the modulated light signal and demodulation signals of FIG. 9. Referring to FIGS. 9 and 10, as illustrated in FIG. 9, when the modulated light signal MLS' has the rising time TR and the falling time TF, the first correlation function x' and the second correlation function y' using pixel signals A0' to A4' may be illustrated in a graph of FIG. 10 according to a distance normalized by the maximum measurable distance.

Figure 11:
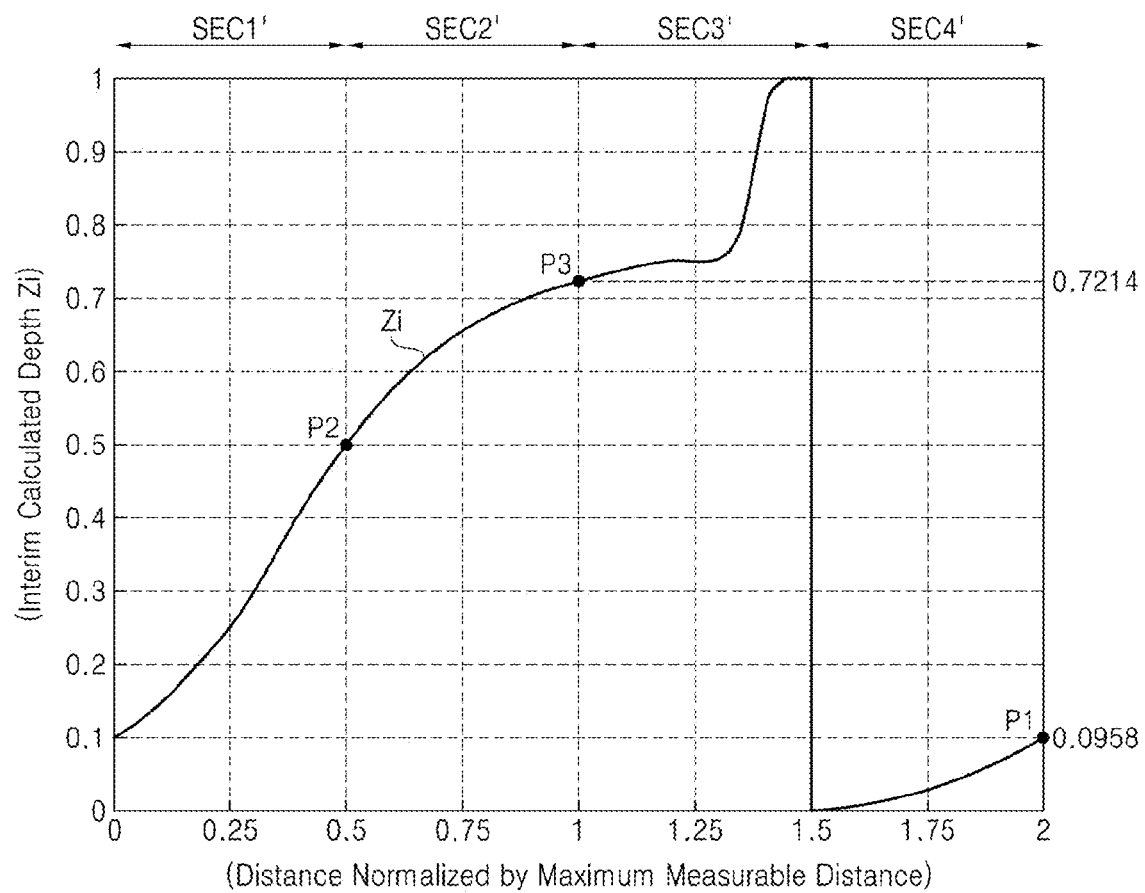
FIG. 11 is a graph depicting an intermediate calculated depth calculated using the correlation functions illustrated in FIG. 10.
Figure 12:
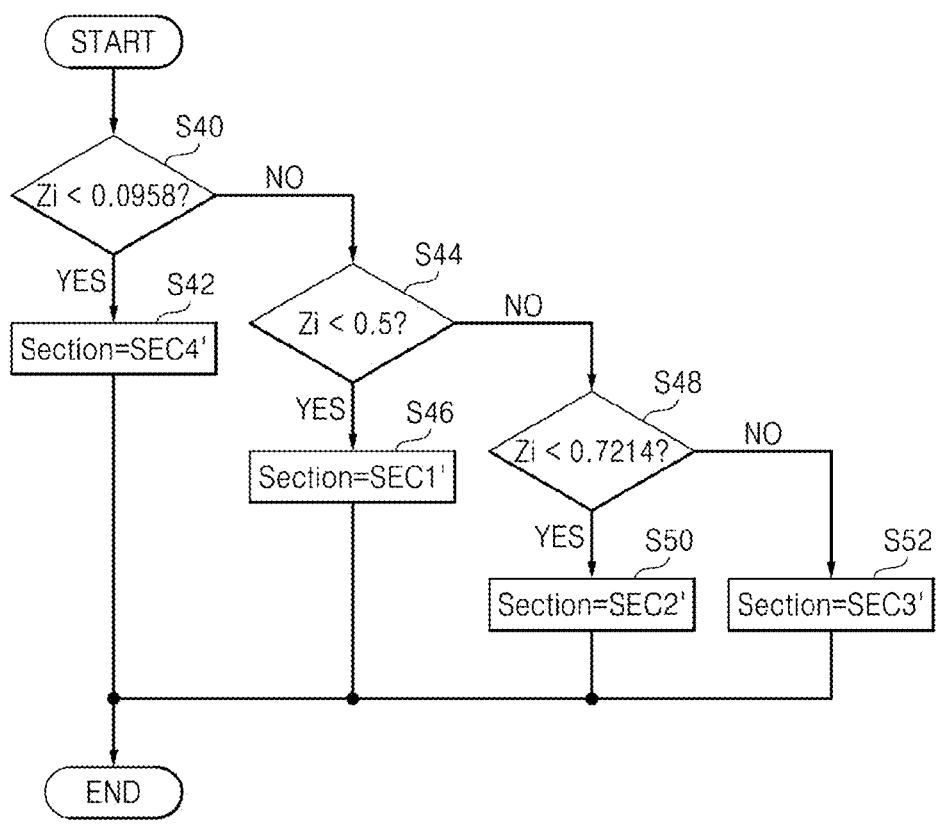
FIG. 12 is a flowchart depicting a method of separating sections illustrated in FIG. 11.

FIG. 11 is a graph depicting an intermediate calculated depth calculated using the correlation functions illustrated in FIG. 10. FIG. 12 is a flowchart depicting a method of separating sections illustrated in FIG. 11. Referring to FIGS. 10 and 11, an intermediate calculated depth Zi may be calculated using the first correlation function x' and the second correlation function y' of FIG. 10.

According to an example embodiment, the intermediate calculated depth Zi may be calculated by an equation $Zi=\tan-1(y/x)$. Using a value of the intermediate calculated depth Zi, a section in which the intermediate calculated depth Zi is included may be determined.

Referring to FIGS. 11 and 12, the intermediate calculated depth Zi may be compared to a value of a first point P1, e.g., 0.0958(S40). According to a result of the comparison in S40, when the intermediate calculated depth Zi is less than the value of the first point P1, e.g., 0.0958, the intermediate calculated depth Zi may be determined to be included in the fourth section SEC4' (S42).

According to the result of the comparison in operation S40, when the intermediate calculated depth Zi is equal to or greater than the value of the first point P1, e.g., 0.0958, the intermediate calculated depth Zi may be compared to a value of a second point P2, e.g., 0.5(S44).

According to a result of the comparison in operation S44, when the intermediate calculated depth Zi is less than the value of the second point P2, e.g., 0.5, the intermediate calculated depth Zi may be determined to be included in the first section SEC1' (S46). According to the result of the comparison in operation S44, when the intermediate calculated depth Zi is equal to or greater than the value of the second point P2, e.g., 0.5, the intermediate calculated depth Zi may be compared to a value of a third point P3, e.g., 0.7214 (S48).

According to a result of the comparison in operation S48, when the intermediate calculated depth Zi is less than the value of the third point P3, e.g., 0.7214, the intermediate calculated depth Zi may be determined to be included in the second section SEC2' (S50). According to the result of the comparison in operation S48, when the intermediate calculated depth Zi is equal to or greater than the value of the third point P3, e.g., 0.7214, the intermediate calculated depth Zi may be determined to be included in the third section SEC3' (S52).

According to each section SEC 1' to SEC4' where the intermediate calculated depth Zi is included, a final calculated depth Zf may be calculated by different equations. This will be described in detail referring to FIG. 13.

FIG. 13 is an example embodiment of equations for calculating a final calculated depth in each of the sections illustrated in FIG. 11. Referring to FIGS. 11 to 13, when the intermediate calculated depth Zi is included in the first section SEC1', the final calculated depth Zf may be calculated by a first equation $Zf=-6.896*(Zi)^4+13.87*(Zi)^3-9.683*(Zi)^2+3.806*(Zi)-0.2858$.

When the intermediate calculated depth Zi is included in the second section SEC2', the final calculated depth Zf may be obtained by a second equation $Zf=182.2*(Zi)^4-407.7*(Zi)^3+344.8*(Zi)^2-129.1*(Zi)+18.42$.

When the intermediate calculated depth Zi is included in the third section SEC3', the final calculated depth Zf may be calculated by a third equation $Zf=1$. When the intermediate calculated depth Zi is included in the fourth section SEC4', the final calculated depth Zf may be calculated by a fourth equation $Zf=1$.

Figure 14:
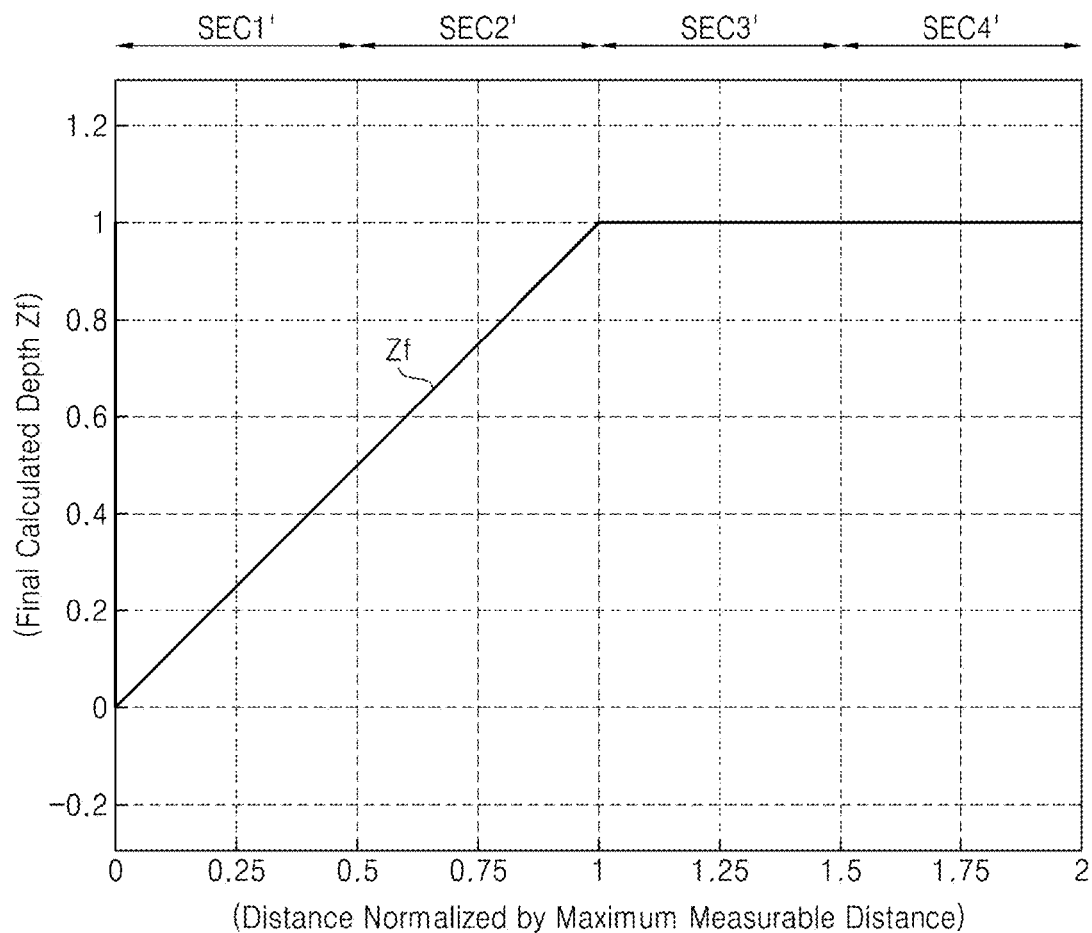
FIG. 14 is a graph depicting a final calculated depth calculated using equations of FIG. 13.

FIG. 14 is a graph depicting a final calculated depth calculated using the equations of FIG. 13. Referring to FIGS. 11 to 14, the final calculated depth Zf may be calculated using the equation of FIG. 13 corresponding to each section SEC1' to SEC4', the first correlation function x', and the second correlation function y'. The final calculated depth Zf may be shown in a form of the graph of FIG. 14.

The final calculated depth Zf normalized in the maximum measurable distance, e.g., "1" on the x-axis, is one, and the final calculated depth Zf is saturated or suppressed to be one in a distance, e.g., a distance from one to two on the x-axis, which is farther than the maximum measurable distance.

As described above, when n determining the duty ratio of the modulated light signal MLS is two, the ambiguity distance may be greater than $(2k-1)*Dmax$ and less than $2k*Dmax$. When k is one, the ambiguity distance is from Dmax to 2Dmax, and when k is two, the ambiguity distance is from 3Dmax to 4Dmax. Further, when n determining the duty ratio of the modulated light signal MLS is three, the ambiguity distance may be greater than (3k−2)Dmax and less than 3k*Dmax. That is, the ambiguity distance is periodically generated.

The final calculated depth Zf is calculated as the same value in the third section SEC3' and the fourth section SEC4', e.g., one.

Figure 15:
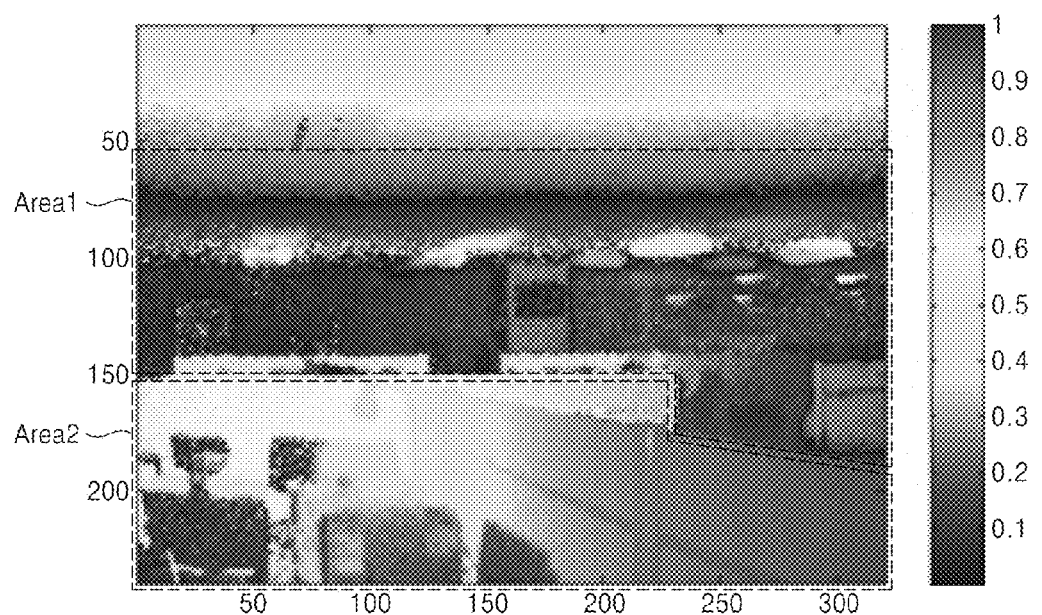
FIG. 15 is a depth image generated using a conventional time of flight (TOF) method.
Figure 16:
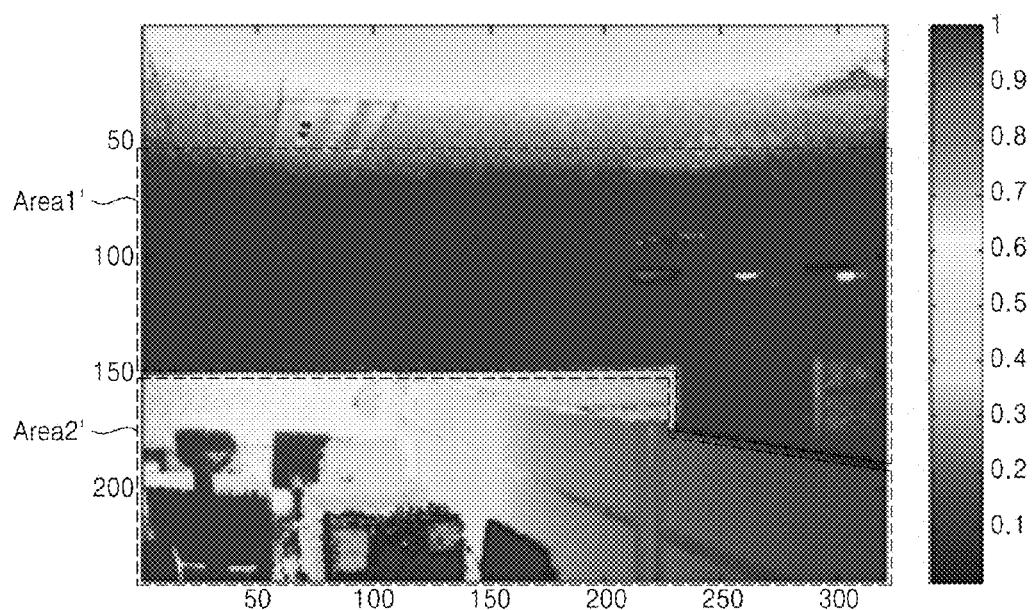
FIG. 16 is a depth image generated using a TOF method according to an example embodiment of the present inventive concepts.

FIG. 15 is a depth image generated using a conventional time of flight (TOF) method. FIG. 16 is a depth image generated using the TOF method according to an example embodiment of the present inventive concepts. In the case of a depth image of FIG. 15, which is generated using the conventional TOF method, even if a first area Area1 is a region farther than a second area Area 2, a distance of the first area Area1 and a distance of the second area Area2 are not clearly distinguished from each other.

However, in the case of the depth image of FIG. 16 generated using the TOF method according to an example embodiment of the present inventive concepts, a distance farther than a maximum measurable distance in the first area Area1' is processed to be a distance equal to the maximum measurable distance, so that the distance of the first area Area1' and the distance of the second area Area2' are clearly distinguished from each other.

Figure 17:
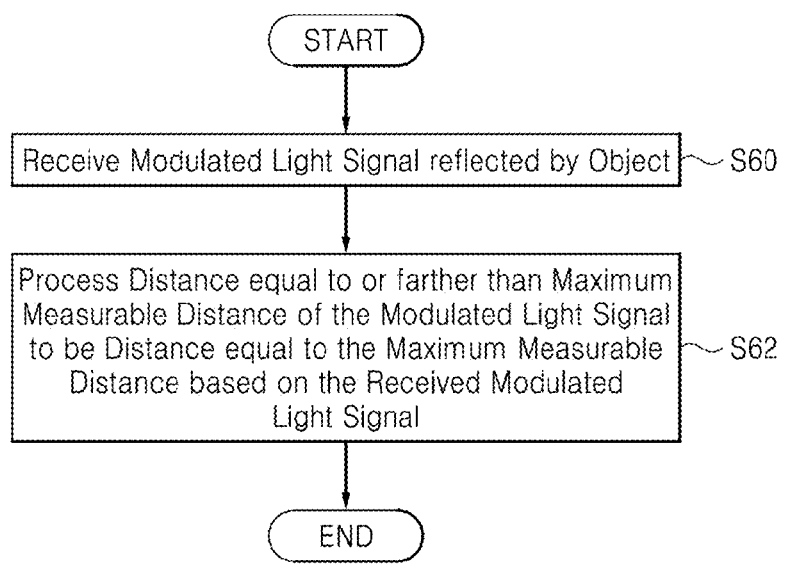
FIG. 17 is a flowchart of a method of calculating a distance using a depth sensor according to an example embodiment of the present inventive concepts.

FIG. 17 is a flowchart of a method of calculating a distance using a depth sensor according to an example embodiment of the present inventive concepts. Referring to FIGS. 1 to 17, the image sensor 100 may receive a modulated light signal RMLS which is output from the light source 20 and reflected by the object 1 (S60).

The image sensor 100 may output image data IDATA related to the pixel signals A0 to A3 generated based on the received modulated light signal RMLS and demodulation signals G0 to G3 to the ISP 200.

The ISP 200 may receive the image data IDATA related to the pixel signals A0 to A3, and process a distance equal to or more than a maximum measurable distance of the modulated light signal MLS to be a distance equal to the maximum measurable distance using the image data IDATA (S62). The ISP 200 may transmit the processed image data IDATA' to the display unit 300, and the display unit 300 may display the processed image data IDATA'.

A device according to some example embodiments of the present inventive concepts may distinguish an ambiguity distance using a light signal having a specific modulated pattern and demodulation signals input to each unit pixel, and remove the ambiguity distance. Accordingly, the device may reduce a distance calculation error.

Although a few example embodiments o have been shown and described, it will be appreciated by those skilled in the art that changes may be made in these example embodiments without departing from the principles and spirit of the inventive concepts, the scope of which is defined in the appended claims and their equivalents.

What is claimed is:

1. A method of calculating, using a depth sensor, a distance excluding an ambiguity distance, the method comprising:
   outputting a modulated light signal output from a light source to an object;
   receiving a modulated light signal input from the object, the modulate light signal input being the modulated light signal output reflected by the object;
   calculating a distance between the light source and the object using the modulated light signal input to photo gates in conjunction with demodulation signals supplied to the photo gates, the calculating including calculating, using the modulated light signal input, at least one distance farther than a maximum measurable distance; and
   setting the at least one distance farther than the maximum measurable distance to be equal to the maximum measurable distance to remove the ambiguity distance.

2. The method of claim 1, wherein a range of the distance farther than the maximum measurable distance is determined according to a duty ratio of the modulated light signal input.

3. The method of claim 1, wherein a duty ratio of each of the demodulation signals and the modulated light signal input is determined to be $1/(2n)$, where n is a natural number.

4. The method of claim 1, wherein the maximum measurable distance is determined according to $Dmax=c/(2f)$,
   where Dmax is the maximum measurable distance, c is a speed of light, and f is a frequency of the modulated light signal input.

5. The method of claim 1, wherein
   the at least one distance farther than the maximum measurable distance includes a plurality of farther distances, and
   the calculating calculates a distance of a first region among the farther distances as a distance equal to the maximum measurable distance and calculates a distance of a second region among the farther distances as a distance equal to or less than the maximum measurable distance.

6. The method of claim 5, wherein the first region and the second region are periodically repeated.

7. An image processing system comprising:
   a light source configured to output a modulated light signal to an object;
   a depth sensor pixel configured to output a pixel signal using demodulation signals and the modulated light signal reflected by the object;
   a readout circuit configured to output image data corresponding to the pixel signal; and
   an image signal processor configured to calculate a distance between the light source and the object based on the image data, the image signal processor configured to calculate, using the modulated light signal, at least one distance farther than a maximum measurable distance to be a distance equal to the maximum measurable distance.

8. The image processing system of claim 7, wherein a range of the distance farther than the maximum measurable distance is determined according to a duty ratio of the modulated light signal.

9. The image processing system of claim 7, wherein a duty ratio of each of the modulated light signal and the demodulation signals is determined to be $1/(2n)$, where n is a natural number.

10. The image processing system of claim 7, wherein the maximum measurable distance is determined according to $Dmax=c/(2f)$, and
    where Dmax is the maximum measurable distance, c is a speed of light, and f is a frequency of the modulated light signal.

11. The image processing system of claim 7, wherein the at least one distance farther than the maximum measurable distance includes a plurality of farther distances, and
    the image signal processor calculates a distance of a first region among the farther distances as a distance equal to the maximum measurable distance and calculates a distance of a second region among the farther distances as a distance equal to or less than the maximum measurable distance, and the first region and the second region are periodically repeated.

12. The image processing system of claim 7, wherein the depth sensor pixel and the readout circuit are embodied in a first chip, and the image signal processor is embodied in a second chip.

13. The image processing system of claim 12, wherein the first chip and the second chip are packaged into one package.

14. The method of claim 1, further comprising:
displaying a depth image based on results of the setting on a display.

15. A method of calculating a distance using a depth sensor comprising:
outputting a modulated light signal output from a light source to an object;
receiving, using an image sensor, a modulated light signal input from the object, the modulate light signal input being the modulated light signal output reflected by the object;
generating, using the image sensor, image data in conjunction with demodulation signals; and
processing, using an image signal processor, the image data to calculate a measured distance between the light source and the object such that at least one distance farther than a maximum measurable distance is set to be equal to a maximum measurable distance.

16. The method of claim 15, wherein
a duty ratio of the modulated light signal input and each of the demodulation signals is determined to be $1/(2n)$, where n is a natural number, and
a range of the distance farther than the maximum measurable distance is determined according to the duty ratio of the modulated light signal.

17. The method of claim 15, wherein the maximum measurable distance is determined according to $Dmax=c/(2f)$, where Dmax is the maximum measurable distance, c is a speed of light, and f is a frequency of the modulated light signal input.

18. The method of claim 15, wherein the processing includes dividing the measured distance normalized by the maximum measurable distance into a plurality of sections using at least one correlation function, the correlation function derived from a difference between two pixel signals associated with one sub pixel of a unit pixel of the image sensor.

19. The method of claim 18, wherein the processing includes determining a corresponding section by comparing a value of the correlation function with respect to a reference value.

20. The method of claim 15, further comprising:
displaying a depth image based on results of the processing on a display.

* * * * *